Nov. 16, 1937. L. MARSDEN 2,099,614
STAMPING AND EMBOSSING MACHINE AND IN PARTICULAR TO BISCUIT MAKING MACHINES
Filed March 18, 1937 2 Sheets-Sheet 1

Inventor
Leonard Marsden
By his Attorney: Walter Gunn

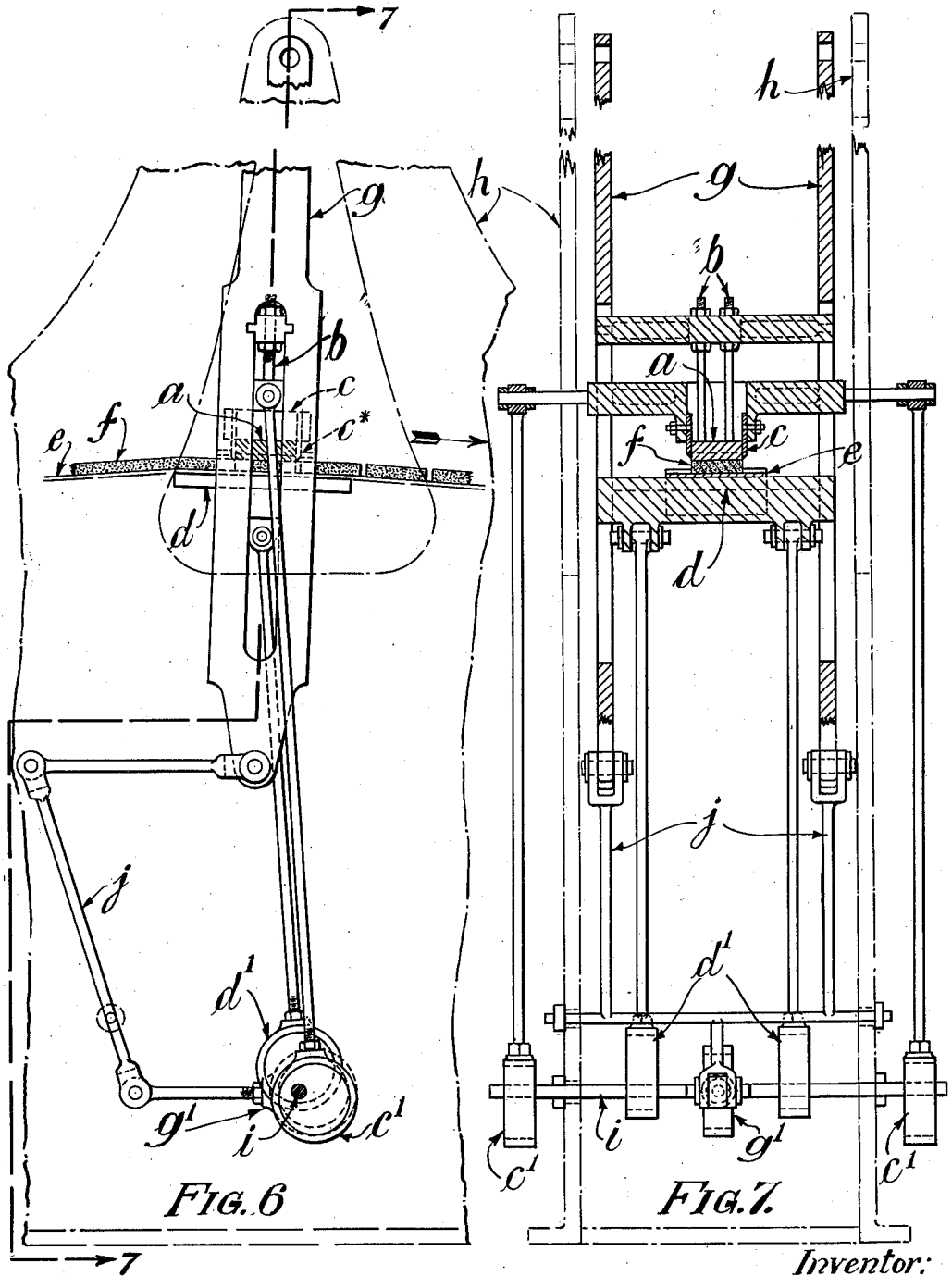

Patented Nov. 16, 1937

2,099,614

UNITED STATES PATENT OFFICE 2,099,614

STAMPING AND EMBOSSING MACHINE AND IN PARTICULAR BISCUIT MAKING MACHINES

Leonard Marsden, Newton-le-Willows, Lancashire, England, assignor of one-third to Jack Lapidus, Manchester, England, and one-third to Percival Marsden, Edmonton, Alberta, Canada Application March 18, 1937, Serial No. 131,638
In Great Britain February 5, 1936

11 Claims. (Cl. 107—26)

This invention relates to stamping and embossing machines of the kind comprising a table on which the work to be treated is placed, and a composite tool, the parts of which have independent movement on to and away from the work. The invention is particularly applicable to biscuit-making machines for cutting out and embossing dough pieces ready for baking, and will be described as applied thereto. It is also applicable, however, to metal working and other presses in which two parts of a tool (say a holding-down element and a die, or a punch and a die) have independent movement towards and away from the work.

As applied to a biscuit-making machine, the invention relates to machines of the kind in which the dough is carried between a table or support and a combined embosser and cutter, the reciprocations of which latter, with respect to the table, perform the cutting-out and embossing operations. These combined embossers and cutters each consist of a central block, with a pattern on its lower face, and a hollow cutter sliding around such block, the lower edge of the cutter being the cutting edge.

The object of the invention is to provide improved constructions of machine, both of a continuous feed type and of an intermittent feed type, having a more efficient cycle of operations, and in which if desired, the reciprocating parts may be positively actuated in both directions, thus dispensing with the usual springs, and avoiding their consequent noise and high power consumption, and also providing a smoother action.

According to the invention, the machine is characterized in that the table or support itself rises and falls, in addition to the reciprocation of the parts of the tool (cutter and/or embosser). This allows of the stroke of the other reciprocating part or parts being shorter and, therefore, relatively slower, and also allows of other advantages of timing hereinafter set forth.

According to a further feature of the invention, the embosser or equivalent part is stationary, the reciprocating cutter (or equivalent part) and table are actuated by rotary eccentrics, cranks, cams or equivalent mechanism, and the reciprocal movement of the cutter is set in advance of that of the table, so that the reciprocal movements of those parts overlap, being in different directions at some parts of the stroke, but in the same direction at other parts of the stroke. The reciprocating parts may have equal strokes or strokes of different length, according to requirements in any particular case. When eccentrics or cams or the like are used to impart the reciprocal movements, that for the cutter will be advanced angularly, say 120° with respect to that for the table.

By so timing the reciprocations of the parts, the table first presses the dough against the embosser, and the cutter then enters the dough, but before the cutting operation is complete the table has fallen away so that the cutter pushes the dough off the embosser. The cutter, however, in continuing its downward movement overtakes the falling table sufficiently to complete the severance of the dough.

Alternatively, a machine as just described may be modified in that the cutter and not the embosser is stationary and the embosser is the reciprocating member, but in such case the table would be set in advance of the embosser, and the embosser would be moving faster than the table just before the cutting operation is complete, so that the cutter would pull the dough off the embosser. Further, the embossing would take place just as the embosser and table are moving at the same speed, i. e., before the embosser assumes a faster speed than the table.

In all cases, where the machine is for treating plastic material, the usual cleaning bar for pushing the "scrap" dough or the like off the outside of the cutter may be provided.

According to a still further feature of the invention the table, cutter and embosser are mounted for bodily reciprocal movement, in one direction moving with the web or band which carries the dough, and on the return, moving in the opposite direction to such web or band, and such bodily movement is so timed with respect to the reciprocal movement of the table, cutter and/or embosser that the actual treatment of the dough by the cutter and embosser is begun and completed whilst the parts are moving bodily with the web or band.

In one embodiment of this feature of the invention, the table, cutter and embosser are mounted in a pivoted or pendulous frame, the swinging of which produces the desired bodily reciprocal motion in the direction of the web or band, and such swinging movement is imparted by a crank, eccentric, or the like, rotating in sympathy with those for operating the table and/or embosser.

The invention is illustrated in the accompanying drawings, wherein:—

Figs. 1 to 4ª illustrate four stages of a cutting operation in a machine in which the embosser is stationary, and also illustrates diagrammatically the relative angular positions of the cranks or eccentrics for reciprocating the cutter and table.

Fig. 6 is a broken side view of a machine embodying the invention and wherein the table, cutter and embosser are suspended in a pendulous frame and moved to and fro in the direction of the length of the web or band.

Fig. 7 is a cross-sectional view of the machine shown in Fig. 6.

Referring to Figs. 1 to 4, $a$ is the embossing tool which is fixed, being carried by the rods $b$ from a relatively fixed part of the machine (not shown), $c$ is the hollow cutter sliding up and down around the embossing tool, $d$ is the table or support, and $e$ is the web or carrier on which lies the dough $f$. The cutter and table are caused to reciprocate up and down by any suitable means working in harmony with each other. Assuming these two parts to be coupled by connecting rods to cranks or eccentrics on a common shaft, such as is the case in Figs. 6 and 7 described later, the diagrams at the left hand side, of each figure represent the respective angular positions of those cranks or eccentrics. In each diagram the thick radius $x$ represents the means for moving the table $d$, and the dotted radius $y$ represents the means for moving the cutter $c$.

Figure 1A:
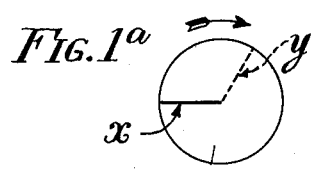
Figure 1:
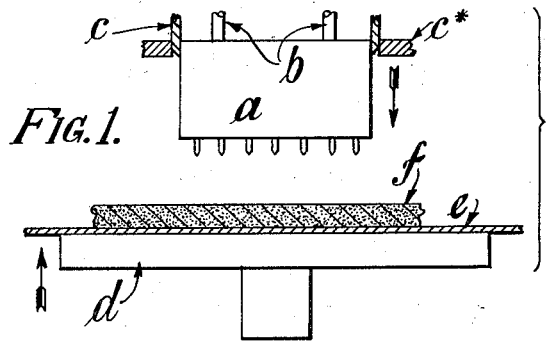

In Fig. 1 the table has completed one half of its upward movement and the cutter is on the descent. The web $e$ has advanced forward so that a fresh supply of dough $f$ is between the table and the combined embosser and cutter.

Figure 2A:
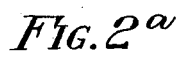
Figure 2:
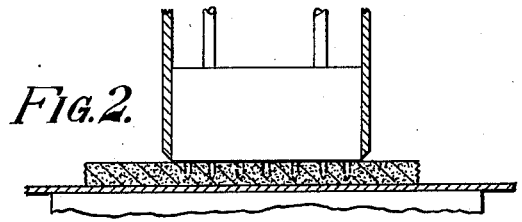

In Fig. 2 the table has reached the top of its stroke and has impressed the dough on the embosser, and the cutter, still on the descent, is about to enter the dough. It will be seen from the diagram that the cutter's downward movement has exceeded the table's upward movement, although the angular displacements of the respective cranks are equal.

Figure 3A:
Figure 3:
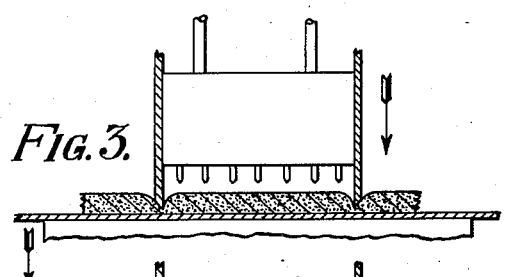

In Fig. 3 the cutting operation is almost complete, but it will be seen that both the table and cutter are now on the descent, but the cutter is still moving faster than the table. Further, owing to the table having fallen, the descending cutter has pushed the dough off the embosser. The cutter finally overtakes the table, and when it (the cutter) has reached the bottom of its stroke, it has completely severed the dough.

Figure 4A:
Figure 4:
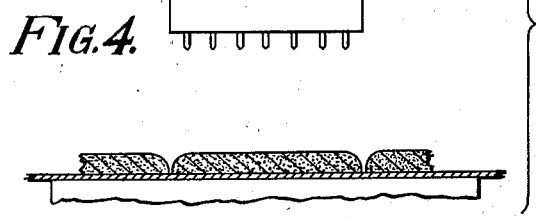

In Fig. 4, the table has continued its downward movement and has reached its lowest position, whilst the cutter is nearing the top of its stroke.

Between the positions of Fig. 4 and Fig. 2, there is opportunity for the dough to be moved forwardly by the web $e$. This can be by an intermittent movement of the web, brought about only when the cutter and embosser are clear of the dough, or, as described later, with reference to Figs. 6 and 7, may be a continuous movement, the table cutter and embosser returning bodily to their initial place between the positions of Figs. 4 and 2.

Figure 5:
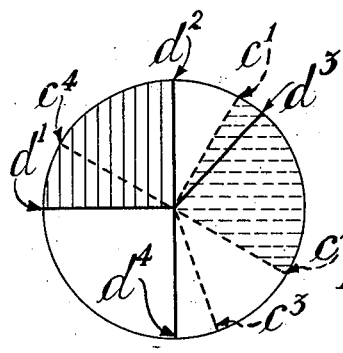
Fig. 5 is a combined timing diagram showing the angular displacements of the cranks or eccentrics when moving between the positions shown in Figs. 1 to 4.

Fig. 5 shows in a single diagram the positions indicated in Figs. 1 to 4, and the shaded portions represent the change of position between Figs. 1 and 2.

In Fig. 1 a clearer $c^*$ is shown for pushing scrap dough off the outside of the cutter $c$ as it nears its highest position.

Referring now to Figs. 6 and 7, the table $d$, cutter $c$ and embosser $a$ are carried by the hanging levers $g$ suspended in the machine frame $h$. The embosser $a$ is stationary with respect to the levers $g$, whilst the table $d$ and cutter $c$ are slidable up and down, being operated by the eccentrics $d^1$ and $c^1$ respectively on the shaft $i$. The web $e$ moves continuously in the direction of the arrow.

Upon the shaft $i$ is a further eccentric $g^1$ which oscillates the lever $j$ and in turn the levers $g$. The table, cutter and embosser are shown in Fig. 6 in positions corresponding to Fig. 2, i. e., with the table at the top of its stroke, and the cutter on the descent, and with the dough impressed on the embosser. The levers $g$, however, are now moving forward with the web $e$, and continue such forward movement until the cutter and embosser have left the dough, whereupon they are returned to the initial position and the cycle of operations is repeated.

Other constructions of mechanism may be devised for imparting the bodily movement to the cutting and embossing mechanism to make the invention applicable to continuous or intermittent feed machines. In some cases, the eccentric shaft $i$ may coincide with the shaft on which the oscillating frame is mounted.

The invention is intended for application to multiple machines having a number of side by side sets of cutting and embossing tools, and with either separate webs or a single web common to them all.

In a modification, not illustrated, the embosser reciprocates as well as the cutter and table, thus in some cases permitting a shorter stroke for the cutter and/or table.

In a second modification, the cutter and embosser descend together, but the cutter continues to descend after the embosser has reached its lowest position, the table falling, or the embosser rising, before the cutting operation is complete.

In all cases, the dough is gripped between the cutter and the web, whilst being separated from the embosser either by the embosser rising or by the cutter and web (i. e., because of the table) descending, and in all cases, also, the cutter completes the severance of the dough after such operation. The cut biscuit is pushed out of the cutter by the embosser when the cutter is drawn back on the embosser if it has not previously come out.

What I claim is:—

1. In a stamping or embossing machine having a table to support the work and a two-part tool to treat the work, the parts of the tool having independent movement towards and away from the table, means for moving the table towards and away from the tools, and means for allowing one part of the tool to withdraw from the work after the other part has begun but before it has completed its operation.

2. In a machine according to claim 1, means for causing that part of the tool which is the last to complete its work to overtake the retracting table in the completion of its operation.

3. A biscuit-making machine of the kind in which the dough is carried between a table or support and a combined cutting-out and embossing tool, the reciprocations of which latter, with respect to the table or support, perform the cutting-out and embossing of the dough, characterized in that the table or support is itself reciprocated towards and away from the tool, in addition to the reciprocation of the cutter and/or embosser and in that the embosser leaves the dough after the cutter has begun but before it has completed the severance of the dough.

4. A biscuit making machine according to claim 3, wherein the reciprocation of the table, cutter and/or embosser is so timed that the table first presses the dough against the embosser and the cutter then enters the dough, but before the cutting operation is complete the table and embosser separate so that the cutter pulls the dough off the embosser.

5. A biscuit making machine according to claim 3, wherein the reciprocation of the table, cutter and/or embosser is so timed that the table first presses the dough against the embosser and the cutter then enters the dough, but before the cutting operation is complete the table and embosser separate so that the cutter pulls the dough off the embosser, and wherein after the pulling of the dough off the embosser the cutter overtakes the table in its movement to complete the cutting operation.

6. A biscuit making machine according to claim 3, wherein the reciprocation of the table, cutter and/or embosser is so timed that the table first presses the dough against the embosser and the cutter then enters the dough, but before the cutting operation is complete the table and embosser separate so that the cutter pulls the dough off the embosser, wherein after the pulling of the dough off the embosser the cutter overtakes the table in its movement to complete the cutting operation, and wherein the embosser is stationary, and the reciprocal movement of the cutter is set in advance of that of the table so as to overtake the table during the final cutting operation.

7. A biscuit making machine according to claim 3, wherein the reciprocation of the table, cutter and/or embosser is so timed that the table first presses the dough against the embosser and the cutter then enters the dough, but before the cutting operation is complete the table and embosser separate so that the cutter pulls the dough off the embosser, wherein after the pulling of the dough off the embosser the cutter overtakes the table in its movement to complete the cutting operation, and wherein the cutter is stationary and the reciprocal movement of the table is set in advance of that of the embosser, so as to lag behind the embosser during the cutting operation.

8. A biscuit making machine according to claim 3, comprising a stationary embossing tool, a sliding cutter surrounding the embossing tool and reciprocated by means, on a shaft, and a table or support also reciprocated by means timed to rotate in step with the first-named means, and characterized in that the reciprocating means for the cutter is set in advance of that for the table at 120° or thereabouts, to cause the cutter and table to pull the dough off the embosser and the cutter thereafter to overtake the table to complete the severance of the dough.

9. A biscuit making machine according to claim 3, comprising a stationary embossing tool, a sliding cutter surrounding the embossing tool and reciprocated by cranks, eccentrics, or the like, on a shaft, and a table or support also reciprocated by cranks, eccentrics or the like, on the same shaft, or on a second shaft rotating therewith, and characterized in that the cranks, eccentrics, or the like for the cutter are set in advance of those for the table at 120° or thereabouts, to cause the cutter and table to pull the dough off the embosser and the cutter thereafter to overtake the table to complete the severance of the dough, and wherein the dough is fed forward intermittently, the forward movements alternating with the cutting and embossing movements.

10. A biscuit making machine according to claim 3, comprising a stationary embossing tool, a sliding cutter surrounding the embossing tool and reciprocated by cranks, eccentrics, or the like on a shaft, and a table or support also reciprocated by cranks, eccentrics or the like, on the same shaft, or on a second shaft rotating therewith, and characterized in that the cranks, eccentrics or the like for the cutter are set in advance of those for the table at 120° or thereabouts, to cause the cutter and table to pull the dough off the embosser and the cutter thereafter to overtake the table to complete the severance of the dough, and wherein the dough is fed forward continuously, and wherein the cutting and embossing tools and the table, whilst performing the cutting and embossing operations on the dough, move forward with the dough, and whilst clear of the dough move backward to the initial position.

11. A biscuit making machine according to claim 3, comprising a stationary embossing tool, a sliding cutter surrounding the embossing tool and reciprocated by means on a shaft, and a table or support also reciprocated by means timed to rotate in step with the first-named means, and characterized in that the reciprocating means for the cutter is set in advance of that for the table at 120° or thereabouts, to cause the cutter and table to pull the dough off the embosser and the cutter thereafter to overtake the table to complete the severance of the dough, and wherein reciprocating means for moving the frame to and fro is mounted on the same shaft as that for operating the table and tools, the cutter and embosser being carried by a pivoted frame which is moved to and fro about its pivot by means working in synchronism with that for operating the table and cutter and embosser.

LEONARD MARSDEN.